Patented Dec. 11, 1934

1,984,059

UNITED STATES PATENT OFFICE 1,984,059

METHOD OF MAKING COLORED BUILDING BLOCKS

Alessandro O. Dandini, San Francisco, Calif.

No Drawing. Application August 7, 1933
Serial No. 684,084

5 Claims. (Cl. 18—60)

The present invention relates to a process or method of making colored building blocks and relates particularly to a method of making colored building blocks in which the superficial faces only of the blocks carry the color substance. The invention is especially adapted to exteriorly coloring such building blocks as are made from plastic clays which are formed in a mold by means of pressure and are thereafter dehydrated by an intense heat, such as is produced in the well-known brick kiln.

The mechanical apparatus employed in the making of colored building blocks is well-known and are not herein illustrated or described in detail, but consist generally of a mold to receive the plastic clay and a press by which the plastic clay is impressed into the mold. After the blocks have been given their form in the molds, they are removed from the molds and placed in a drying kiln of well-known type wherein they are baked until they are seasoned or hard.

Among the objects of this invention are to provide a method of coloring exterior surfaces of building blocks. Another object is to provide a method for coloring the superficial faces of building blocks in which the expense of coloring the entire body of the building block is eliminated. Other objects are to provide a method of making colored building blocks which permits ease and facility in producing such colored blocks in small quantities and also provides for ready and easy change from one color to another in course of manufacture, and in general to improve upon the present method of making colored building blocks in an economical and satisfactory manner.

With the foregoing and other objects in view, the invention comprises the steps in the method herein described, it being understood that changes may be made in the order of taking such steps, and in the variation of such steps within the scope of the appended claims, without departing from the spirit and intent of this invention.

The present known method of making colored building blocks of plastic material is to provide a mass of suitable plastic body material such as brick clay or what is known as terra cotta. This plastic material is then colored throughout its entire mass by the mixing therewith of any suitable coloring pigment, a number of which are readily obtainable in the commercial market. A mold of the desired shape is provided and the walls of this mold are coated with comminuted material such as fine sand which is moistened so that it adheres in a film to the walls of the mold. The plastic material, being colored throughout, is then formed in a layer of desired thickness over the openings of the mold, whereupon a press of any suitable type is employed to force the colored plastic mass into the molds whereby it is formed to predetermined shape. The formed shapes are then removed from the mold, the sand coating preventing sticking, and the formed shapes are removed to a kiln where they are baked until dehydrated and hard.

Since the coloring pigment is expensive, both in original cost and in the labor required to mix it thoroughly and evenly throughout the mass, it is the novel method of this invention to introduce the coloring pigment into the building block on its superficial faces only, since the faces are the only portions of the block which are exposed to view when the block is incorporated in a structure. In general the novelty of the method consists in the elimination of the coloring pigment throughout the entire mass and in utilizing the sand which coats the mold as the vehicle for carrying the coloring pigment. By the novel step of this method, the clay or plastic material may be mixed in any quantity in the same manner as though uncolored blocks were to be formed. Coloring pigment which may be either dry or liquid is mixed with the comminuted sand with which the walls of the mold are coated. If the coloring pigment is dry, the mixed coloring pigment and sand are moistened so that they adhere to the walls of the mold. Any suitable well-known commercial coloring pigment may be used and since there are many such in the commercial market, I do not express a preference for a particular type except that it must be a coloring pigment which will not burn out in the drying kiln. Having colored the sand with the pigment, and having coated the walls of the mold therewith, the plastic clay is superimposed upon the mold and pressed into the cavities of the mold by means of a press. This pressure impregnates the surface only of the faces of the plastic clay with the coating of colored sand which theretofore has adhered to the walls of the mold. The formed blocks are then removed from the mold with all their faces which were in contact with the mold impregnated with the combined coloring pigment and sand, and the blocks are then removed to and placed in a drying kiln where they are dehydrated and baked in the usual manner, thus baking the coloring pigment into the exterior faces only of the block.

From this description, it is obvious that the necessity for coloring the entire plastic body is eliminated and it is further obvious that by this method a large mass of moldable material may be prepared at one time, and a portion of it run through the press without any coloring material at all, another portion may be run through by the use of one color, and followed by successive large or small batches of successive different colors, since to change a color merely necessitates the mixing together of the desired coloring pigment and the sand with which the side walls of the mold are coated.

It is ordinarily sufficient for practical purposes if the face of the formed block which receives the contact of the press remains uncolored, but if it is also desired to have this face colored similarly to the other faces of the block, the press may be lifted after the formation of the plastic material in the molds and then a coating of the colored sand may be spread thinly upon the exposed uncolored surface whereupon the press is again actuated into contact with the material in the molds and impresses the superimposed thin layer of combined pigment and sand into the exposed face of the plastic material.

Having thus described the method of my invention, what I claim and desire to secure by Letters Patent is:—

1. A method of making colored building blocks which includes the steps of making a moist mixture of a granular sandy body with a coloring material, coating the inner face walls of a mold with said mixture, pressing a plastic mass into the mold with sufficient pressure to form simultaneously a shaped block and to impregnate faces of the shaped block which are in contact with the inner faces of the mold with the moist mixture with which the inner walls of the mold are coated, removing the impregnated block from the mold, and subjecting the impregnated block to the step of baking by heat.

2. A method of making colored building blocks which includes the steps of providing a moist colored mold coating mixture by mixing a coloring material with fine sandy material in the presence of moisture, coating the inner walls of a mold with the colored mixture so that it releasably adheres to said walls due to moisture, pressing a plastic mass into the mold with sufficient pressure to simultaneously form a shaped block and to impregnate faces of the block which are in contact with the inner faces of the mold with the comminuted colored mold coating mixture, and subjecting the impregnated block to the step of baking by heat.

3. A method of making colored building blocks which includes the steps of providing a moist mix of coloring and granular sandy material, releasably adhering a coating of the moist mix to the inner walls of a mold, pressing a plastic mass into the mold with sufficient pressure simultaneously to form a shaped block and to impregnate faces of the block which are in contact with the inner walls of the mold with the colored mixed sandy material, and subjecting the impregnated block to the step of baking by heat.

4. A method of making facially colored building blocks, which includes the steps of pressing into a mold a plastic mass of material which is free of extraneous coloring matter, and simultaneously impregnating the faces of the formed blocks while they are in the mold and in a plastic state with a moist mixture of coloring material and granular sandy material, and subjecting the facially colored block to the step of baking by heat.

5. A method of making facially colored building blocks, which includes the steps of forming a shaped block of plastic material which is of a substantially uniform color throughout its body, and, simultaneously with forming the shaped block, superficially impregnating a face of said shaped block with a moist mixture of sand carrying coloring material while the block is in a plastic condition, and subjecting the facially impregnated plastic block to baking by heat.

ALESSANDRO O. DANDINI.